US012189324B2

(12) United States Patent
Kageyama

(10) Patent No.: US 12,189,324 B2
(45) Date of Patent: Jan. 7, 2025

(54) IMAGE FORMING APPARATUS

(71) Applicant: KYOCERA Document Solutions Inc., Osaka (JP)

(72) Inventor: Ryohei Kageyama, Osaka (JP)

( * ) Notice: Subject to any disclaimer, the term of this patent is extended or adjusted under 35 U.S.C. 154(b) by 0 days.

(21) Appl. No.: 18/523,656

(22) Filed: Nov. 29, 2023

(65) Prior Publication Data

US 2024/0176278 A1 May 30, 2024

(30) Foreign Application Priority Data

Nov. 30, 2022 (JP) ................................ 2022-191487

(51) Int. Cl.
*G03G 21/10* (2006.01)
*G03G 21/12* (2006.01)
*G03G 21/16* (2006.01)

(52) U.S. Cl.
CPC ....... *G03G 21/105* (2013.01); *G03G 21/1619* (2013.01); *G03G 21/12* (2013.01)

(58) Field of Classification Search
CPC ... G03G 21/105; G03G 21/1619; G03G 21/12
See application file for complete search history.

(56) References Cited

U.S. PATENT DOCUMENTS

2007/0297840 A1* 12/2007 Onodera ................ G03G 21/12 399/358
2010/0247137 A1* 9/2010 Akaike .................. G03G 21/12 399/110
2014/0270882 A1* 9/2014 Satoh ..................... G03G 21/12 399/360

FOREIGN PATENT DOCUMENTS

JP 2021110777 A 8/2021

* cited by examiner

*Primary Examiner* — Sandra Brase
(74) *Attorney, Agent, or Firm* — Alleman Hall & Tuttle LLP

(57) ABSTRACT

An image forming apparatus includes a housing frame and a waste toner unit. The housing frame includes a support frame which supports the waste toner unit. The waste toner unit includes a waste toner bottle and a retention sheet metal which retains the waste toner bottle. The support frame includes a through-hole. The retention sheet metal includes a convex portion inserted into the through-hole, and a wedge member which protrudes from the convex portion. The wedge member latches the convex portion to an edge portion of the through-hole in the support frame.

4 Claims, 7 Drawing Sheets

IMAGE FORMING APPARATUS

INCORPORATION BY REFERENCE

This application is based upon and claims the benefit of priority from the corresponding Japanese Patent Application No. 2022-191487 filed on Nov. 30, 2022, the entire contents of which are incorporated herein by reference.

BACKGROUND

The present disclosure relates to an image forming apparatus.

A powder recovery apparatus such as a waste toner recovery apparatus is known.

SUMMARY

In the present disclosure, an image forming apparatus includes a housing frame and a waste toner unit. The housing frame includes a support frame which supports the waste toner unit. The waste toner unit includes a waste toner bottle and a retention sheet metal which retains the waste toner bottle. The support frame includes a through-hole. The retention sheet metal includes a convex portion and a wedge member. The convex portion is inserted into the through-hole. The wedge member protrudes from the convex portion and latches the convex portion to an edge portion of the through-hole in the support frame.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
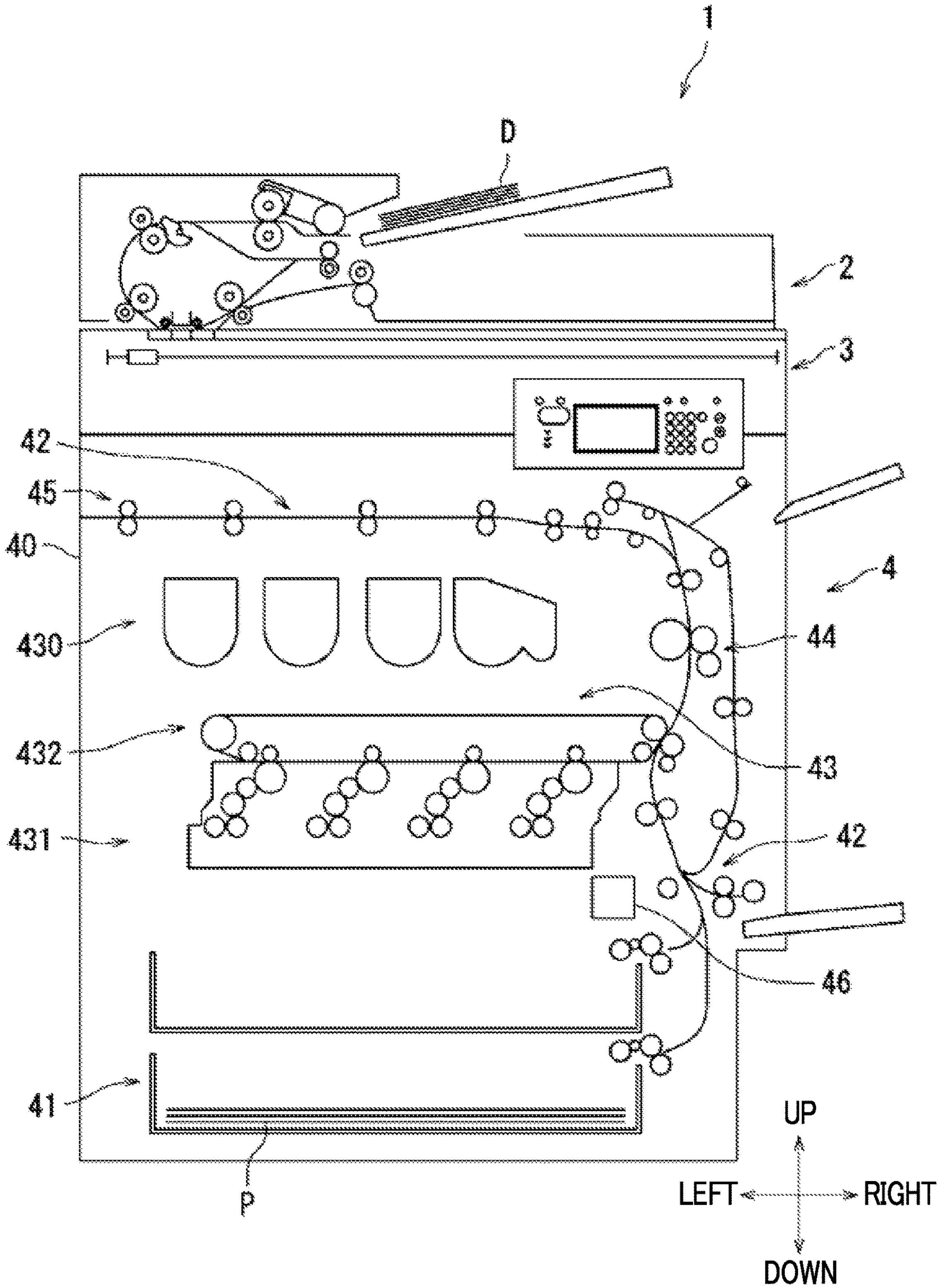
FIG. 1 is a diagram showing a multifunction peripheral including an image forming apparatus according to an embodiment of the present disclosure.

Hereinafter, an embodiment of the present disclosure will be described with reference to the drawings. It is noted that in the figures, the same or corresponding portions are denoted by the same reference numerals, and descriptions will not be repeated.

Figure 2:
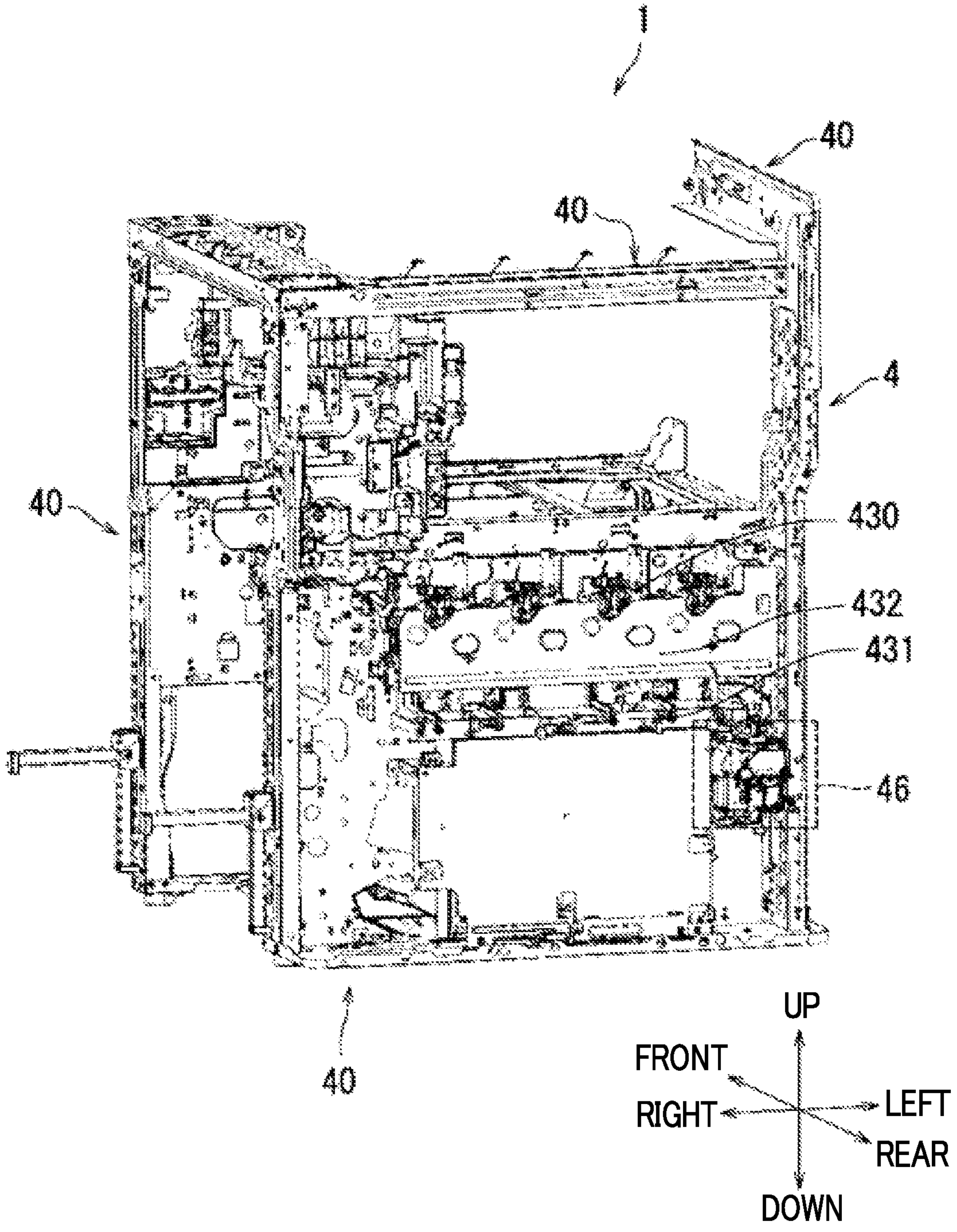
FIG. 2 is a diagram showing a frame structure of the multifunction peripheral including the image forming apparatus according to the present embodiment.

With reference to FIG. 1, an image forming apparatus 4 according to the embodiment of the present disclosure will be described. FIG. 1 shows a multifunction peripheral 1 including the image forming apparatus 4 according to the embodiment of the present disclosure. FIG. 2 shows a frame structure of the multifunction peripheral 1 including the image forming apparatus 4 according to the present embodiment.

As shown in FIG. 1, the multifunction peripheral 1 includes a document sheet conveying apparatus 2, an optical apparatus 3, and the image forming apparatus 4.

The document sheet conveying apparatus 2 conveys a document sheet D to the optical apparatus 3. The optical apparatus 3 reads an image formed on the document sheet D and generates image information. The image forming apparatus 4 forms an image on a sheet P.

The image forming apparatus 4 includes a housing frame 40, a feed portion 41, a conveying portion 42, an image forming portion 43, a fixing portion 44, a discharge portion 45, and a waste toner unit 46.

As shown in FIG. 2, the housing frame 40 includes a support frame 400. The support frame 400 supports the waste toner unit 46.

As shown in FIG. 1, the feed portion 41 supplies the sheet P to the conveying portion 42. The conveying portion 42 conveys the sheet P to the image forming portion 43.

The image forming portion 43 includes a toner unit 430, a developing unit 431, and a transfer unit 432.

For example, the image forming portion 43 is a tandem-type color image forming portion. The toner unit 430 supplies cyan, magenta, yellow, and black toner to the developing unit 431. The developing unit 431 forms toner images on the transfer unit 432. The transfer unit 432 transfers the toner images onto the sheet P conveyed by the conveying portion 42.

The sheet P onto which the toner images have been transferred is conveyed to the fixing portion 44 by the conveying portion 42. The fixing portion 44 heats and pressurizes the sheet P by a fixing roller and a pressure roller so as to fix the toner images formed on the sheet P onto the sheet P.

The sheet P that has passed through the fixing portion 44 is conveyed to the discharge portion 45 by the conveying portion 42 and is discharged onto a discharge tray of the discharge portion 45.

As shown in FIG. 1 and FIG. 2, the waste toner unit 46 recovers waste toner discarded from the developing unit 431 or the transfer unit 432, for example.

Next, with reference to FIG. 1, FIG. 2, and FIG. 3 to FIG. 9, configurations of the support frame 400 of the housing frame 40 and the waste toner unit 46 and a relationship between the support frame 400 and the waste toner unit 46 will be described.

Figure 3:
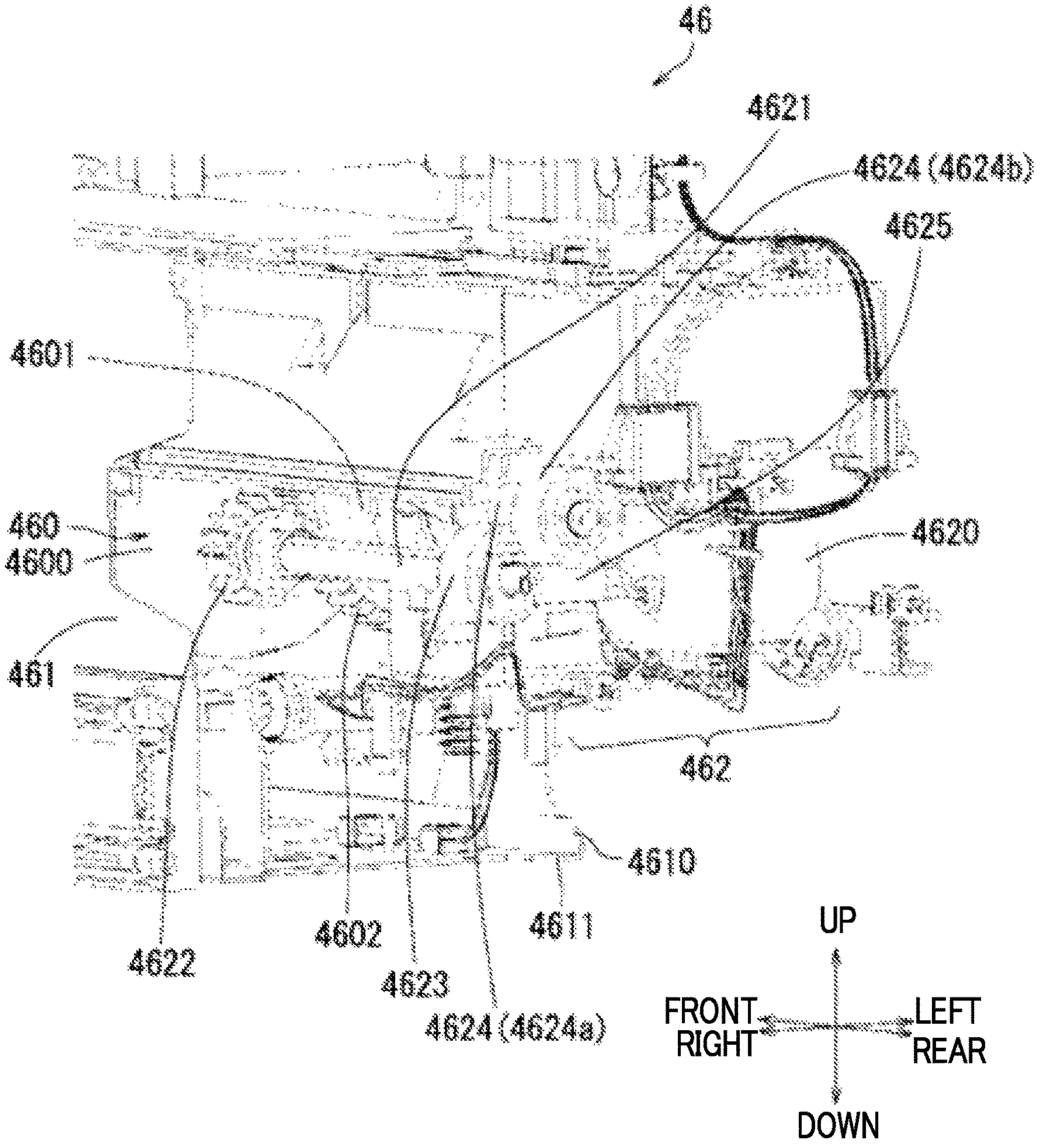
FIG. 3 is a diagram showing a configuration of a waste toner unit in the image forming apparatus according to the present embodiment.
Figure 4:
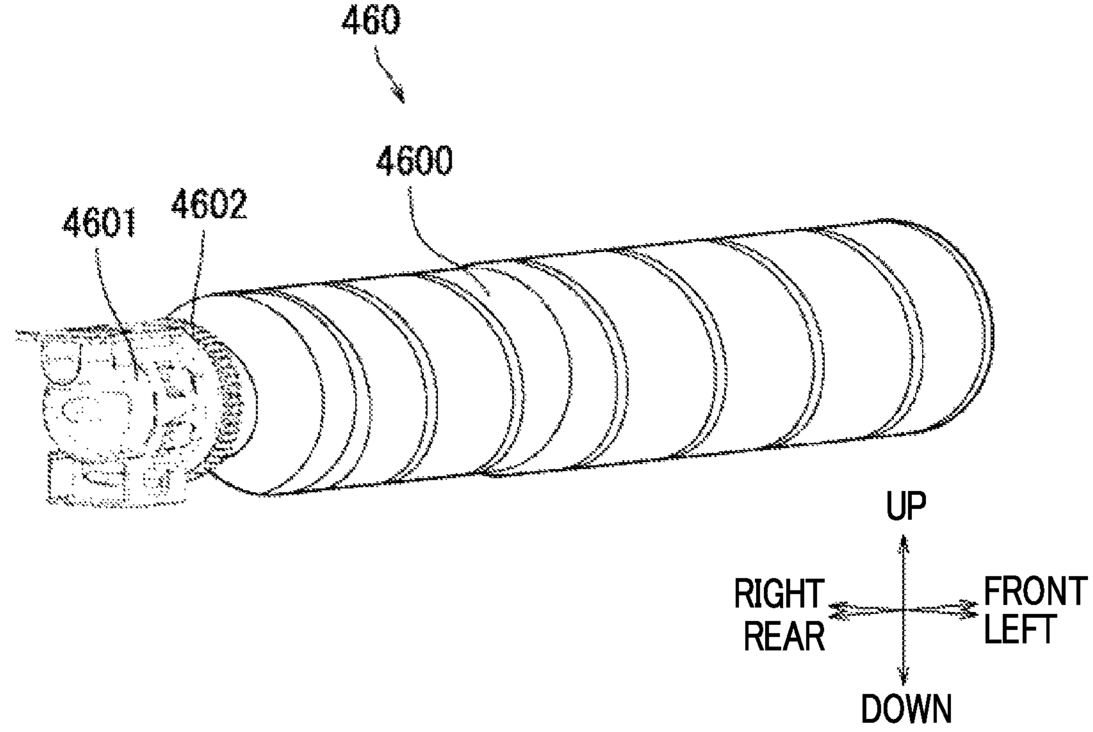
FIG. 4 is a diagram showing a waste toner bottle.
Figure 5:
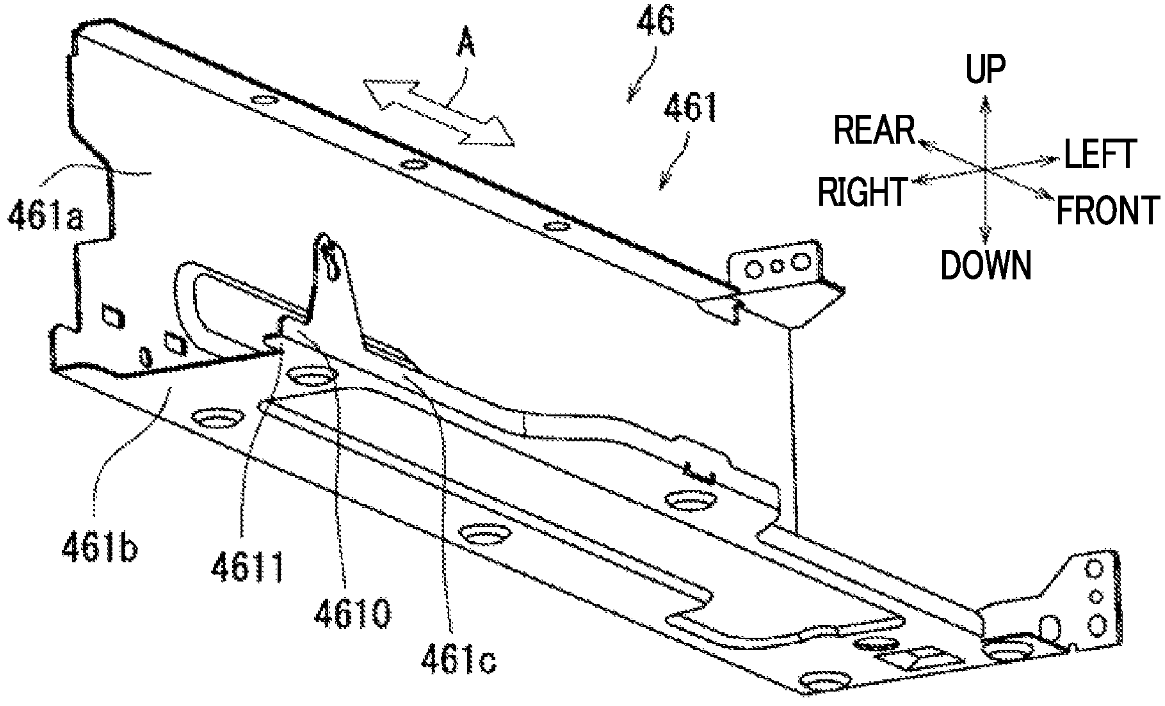
FIG. 5 is a diagram showing a retention sheet metal.
Figure 6:
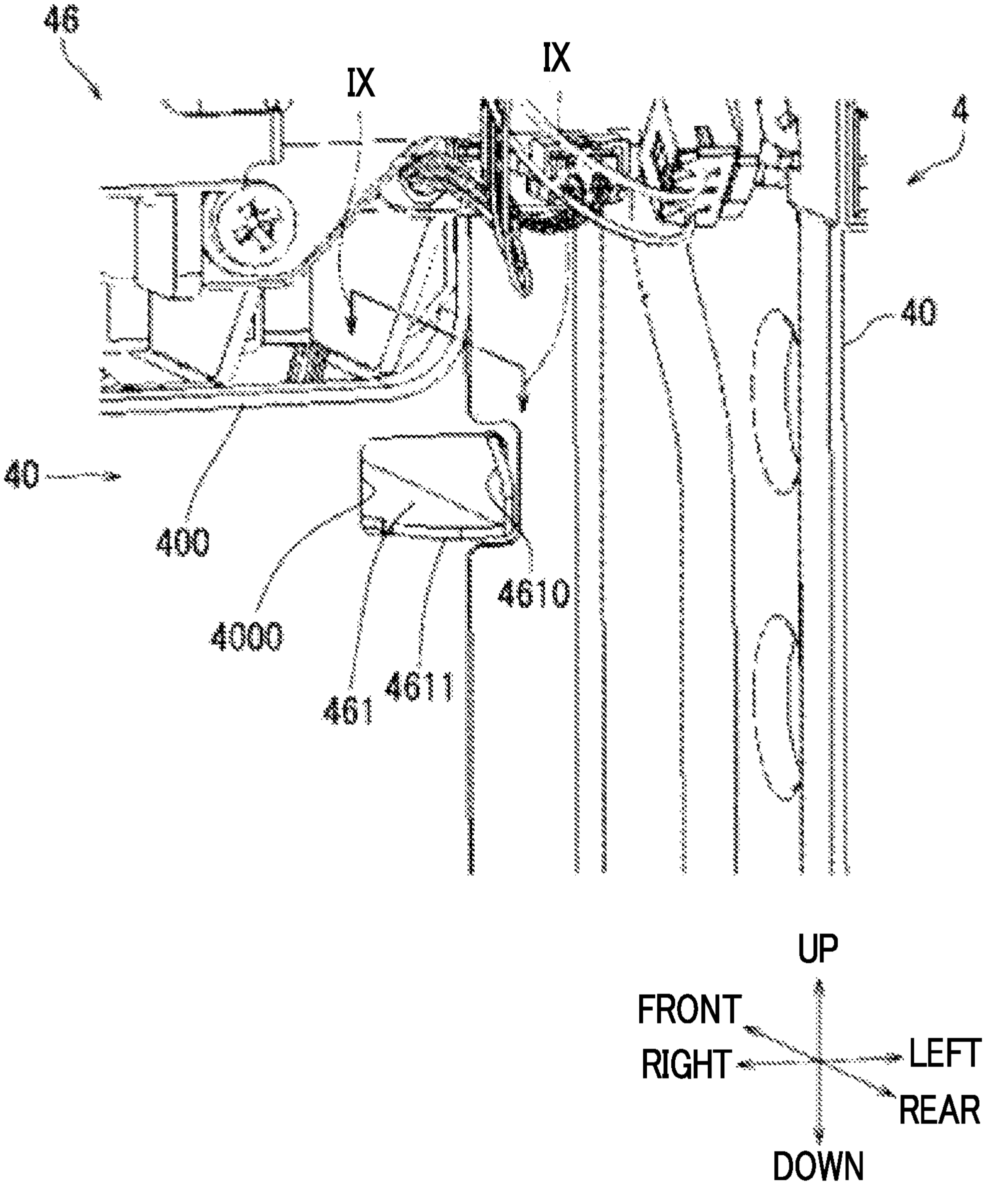
FIG. 6 is a diagram showing a coupling portion between the retention sheet metal and a support frame.
Figure 7:
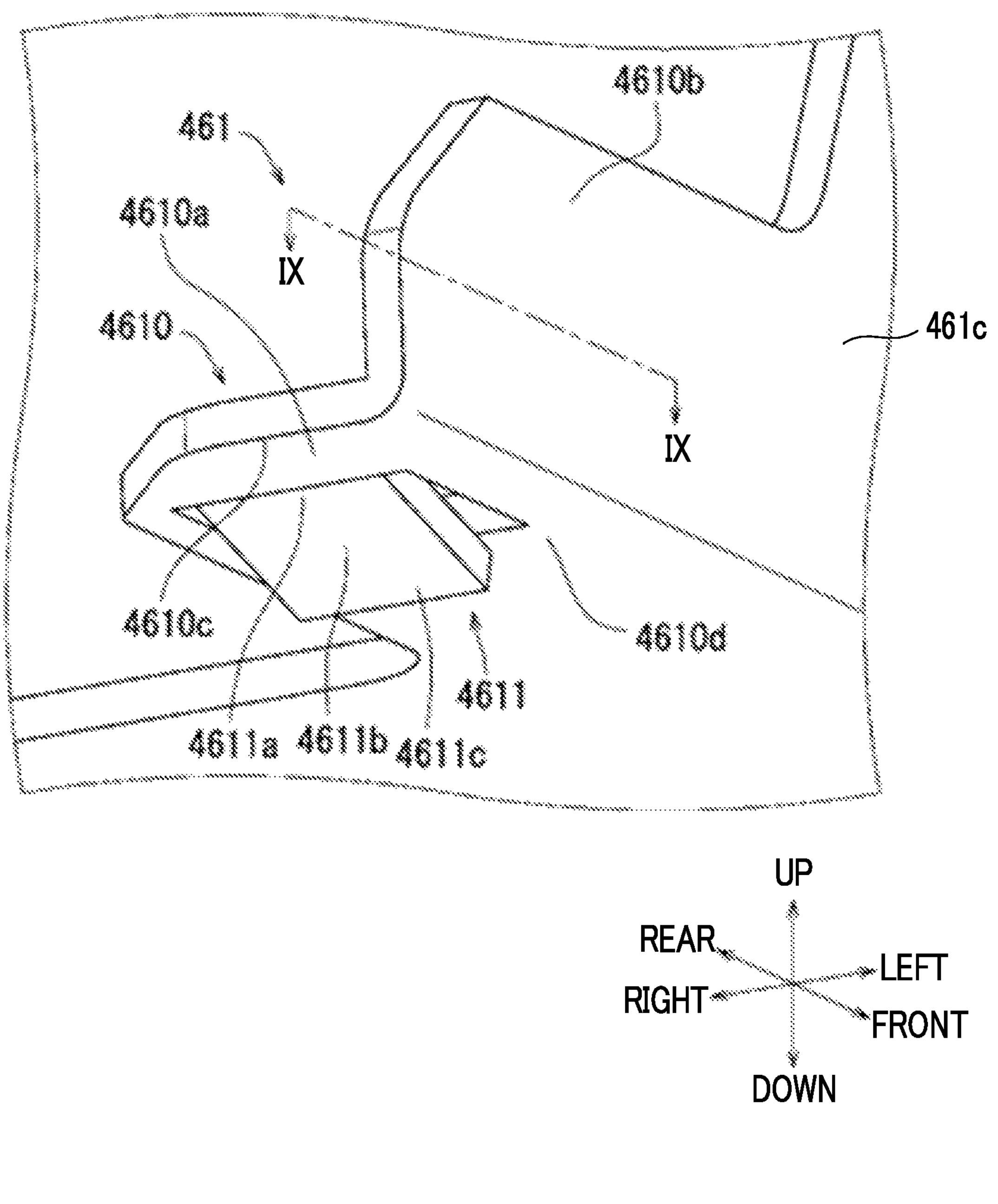
FIG. 7 is an enlarged view showing a convex portion of the retention sheet metal.
Figure 8:
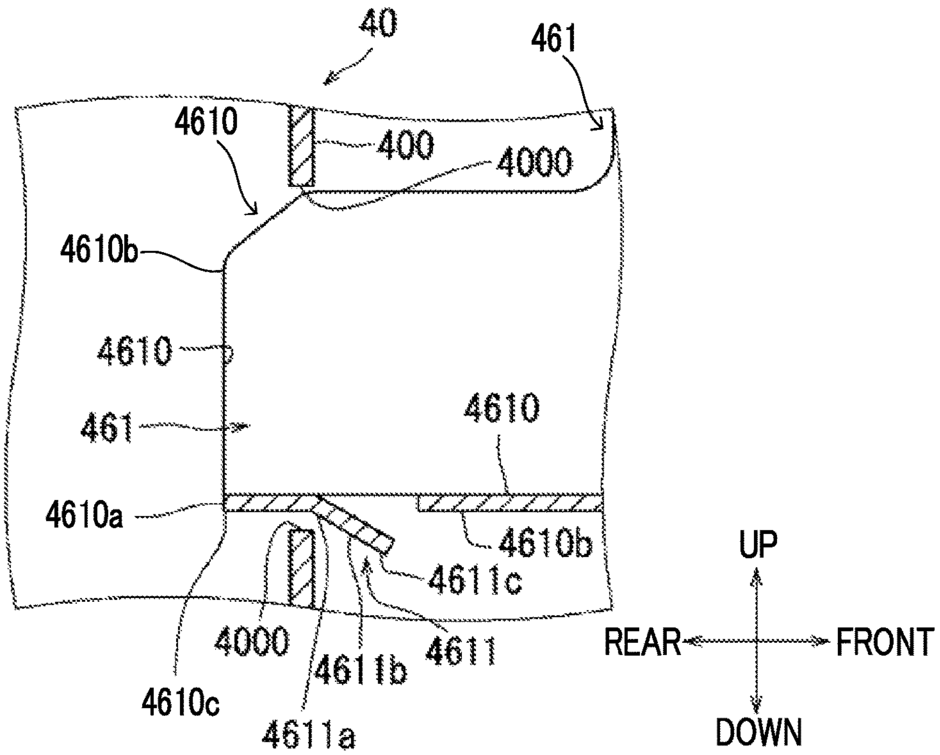
FIG. 8 is a diagram showing a relationship between a wedge member of the retention sheet metal and the support frame.
Figure 9:
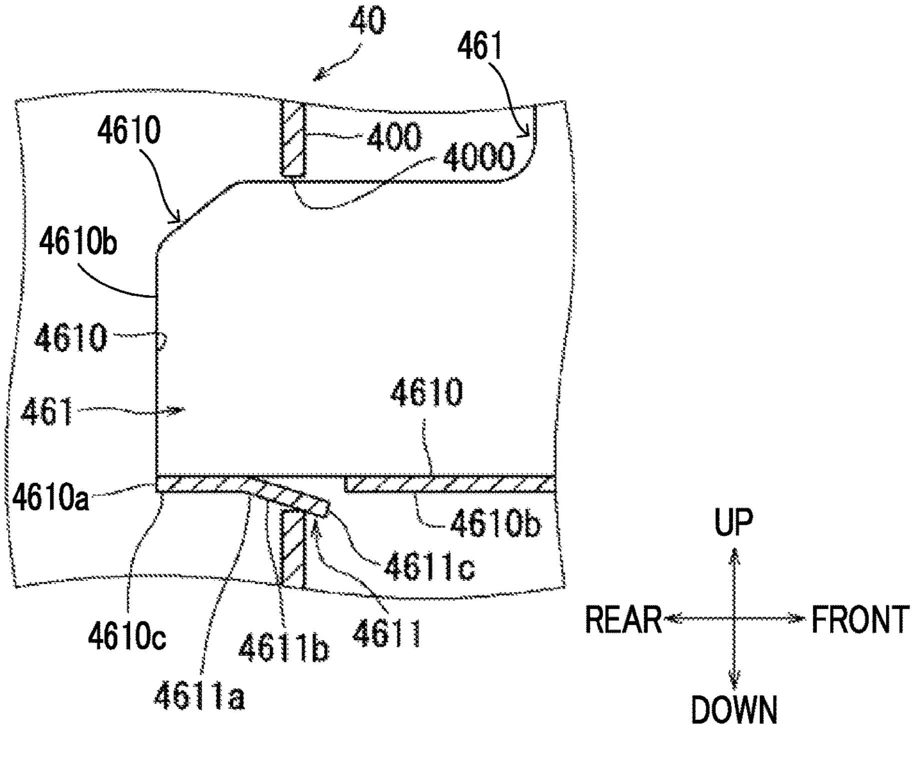
FIG. 9 is a diagram showing the relationship between the wedge member of the retention sheet metal and the support frame.

FIG. 3 shows a configuration of the waste toner unit 46 in the image forming apparatus 4 according to the present embodiment. FIG. 4 shows a waste toner bottle 460. FIG. 5 shows a retention sheet metal 461. FIG. 6 shows a coupling portion between the retention sheet metal 461 and the support frame 400. FIG. 7 is an enlarged view showing a convex portion 4610 of the retention sheet metal 461. FIG. 8 shows a relationship between a wedge member 4611 of the retention sheet metal 461 and the support frame 400. FIG. 9 shows the relationship between the wedge member 4611 of the retention sheet metal 461 and the support frame 400.

FIG. 3 is a perspective view of the waste toner unit 46 seen from a rear upper right-hand direction. As shown in FIG. 3, the waste toner unit 46 includes the waste toner bottle 460, the retention sheet metal 461, and a drive mechanism 462.

FIG. 4 is an external perspective view of the waste toner bottle 460 seen from a rear upper left-hand direction. The waste toner bottle 460 stores therein waste toner recovered from the developing unit 431 or the transfer unit 432, for example.

As shown in FIG. 3 and FIG. 4, the waste toner bottle 460 includes a bottle body 4600, a cap 4601, and a bottle gear 4602.

The bottle body 4600 is hollow inside for storing waste toner therein.

The cap 4601 causes the waste toner recovered from the developing unit 431 or the transfer unit 432 to flow into the bottle body 4600.

As shown in FIG. 3, the bottle gear 4602 intermeshes with a transmission gear 4622 of the drive mechanism 462 to be described later. Upon receiving a driving force of the drive mechanism 462 from the transmission gear 4622, the bottle gear 4602 rotates together with the bottle body 4600.

FIG. 5 is an external perspective view of the retention sheet metal 461 of the waste toner unit 46 seen from a rear lower left-hand direction. As shown in FIG. 3 and FIG. 5, the retention sheet metal 461 includes the convex portion 4610 and the wedge member 4611.

As shown in FIG. 5, the retention sheet metal 461 retains the waste toner bottle 460. For example, the retention sheet metal 461 includes a side plate **461*a* and a bottom plate 461*b* that are formed by bending a sheet metal member. In this case, as shown in FIG. 5, the retention sheet metal 461 may substantially have an L shape when the retention sheet metal 461** is seen from the rear side toward the front side.

A reinforcing plate **461*c* that opposes the side plate 461*a* is formed at an edge portion of the bottom plate 461*b* on the other side of the side plate 461*a* side. The reinforcing plate 461*c* is formed to protrude from the bottom plate 461*b* in the same direction as the side plate 461*a*. For example, the reinforcing plate 461*c*** is formed by bending a sheet metal member, a drawing process, or the like.

The retention sheet metal 461 retains the waste toner bottle 460 by the side plate **461*a* and the bottom plate 461*b*. The waste toner bottle 460 is attachable/detachable to/from the retention sheet metal 461 along a direction of an arrow A in FIG. 5**.

FIG. 6 shows a relationship between the retention sheet metal 461 and the support frame 400. FIG. 6 shows a coupling portion between the retention sheet metal 461 and the support frame 400. FIG. 6 is an enlarged view of the waste toner unit 46 shown in FIG. 1. FIG. 6 also shows an engagement form between the convex portion 4610 and wedge member 4611 of the retention sheet metal 461 shown in FIG. 3 and the support frame 400.

The waste toner bottle 460 shown in FIG. 4 is attached to the retention sheet metal 461 shown in FIG. 5. Thus, the waste toner bottle 460 is incorporated into the waste toner unit 46 as shown in FIG. 3. The housing frame 40 includes the support frame 400 for supporting the waste toner unit 46 shown in FIG. 3 (see FIG. 6).

As shown in FIG. 6, the support frame 400 of the housing frame 40 has a through-hole 4000. The convex portion 4610 of the retention sheet metal 461 shown in FIG. 3 and FIG. 5 is inserted into the through-hole 4000 of the support frame 400. Further, the wedge member 4611 of the retention sheet metal 461 is also inserted into the through-hole 4000 of the support frame 400.

FIG. 7 is an enlarged view of the convex portion 4610 and wedge member 4611 of the retention sheet metal 461 shown in FIG. 5.

As shown in FIG. 7, the convex portion 4610 includes a first plate portion **4610*a* extending from the bottom plate 461*b* and a second plate portion 4610*b* extending from the reinforcing plate 461*c*. The wedge member 4611 protrudes from the first plate portion 4610*a* of the convex portion 4610 in the retention sheet metal 461**.

FIG. 8 and FIG. 9 each show a state where the convex portion 4610 and wedge member 4611 of the retention sheet metal 461 are inserted into the through-hole 4000 of the support frame 400. FIG. 8 and FIG. 9 are each a cross-sectional view taken along an IX-IX plane of the retention sheet metal 461 shown in FIG. 7.

As shown in FIG. 8 and FIG. 9, the wedge member 4611 of the retention sheet metal 461 latches the convex portion 4610 to a lower edge portion of the through-hole 4000 in the support frame 400. In addition, an upper end of the second plate portion **4610*b* of the convex portion 4610 is latched to an upper edge portion of the through-hole 4000 in the support frame 400**.

According to the present embodiment, the support frame 400 and the retention sheet metal 461 are connected strongly. Consequently, it is possible to suppress vibrations and abnormal noises of the waste toner unit 46 that are due to a gap caused at the bonding portion between the support frame 400 and the retention sheet metal 461.

Next, the convex portion 4610 and wedge member 4611 of the retention sheet metal 461 will be described in detail with reference to FIG. 7 to FIG. 9.

As shown in FIG. 7 to FIG. 9, the convex portion 4610 of the retention sheet metal 461 includes a tip end portion **4610*c* in a rear direction. The convex portion 4610 includes a root portion 4610*d*** in a front direction.

As shown in FIG. 8, the convex portion 4610 is inserted into the through-hole 4000 of the support frame 400 from the tip end portion **4610*c* of the convex portion 4610**.

As shown in FIG. 7 to FIG. 9, the wedge member 4611 includes a coupling portion **4611*a*, a tilted portion 4611*b*, and a tip end 4611*c***.

As shown in FIG. 7, the coupling portion **4611*a* is connected to the first plate portion 4610*a* of the convex portion 4610. For example, the first plate portion 4610*a* of the convex portion 4610 and the coupling portion 4611*a* of the wedge member 4611** are formed integrally.

The tilted portion **4611*b* is formed to extend from the coupling portion 4611*a* toward the root portion 4610*d* side of the convex portion 4610. The tilted portion 4611*b* is tilted from the coupling portion 4611*a* toward the root portion 4610*d* of the convex portion 4610 in a direction in which the tilted portion 4611*b* is set apart from the convex portion 4610. The tilted portion 4611*b* is in contact with the edge portion of the through-hole 4000**.

Further, the wedge member 4611 may have elasticity.

The tilted portion **4611*b* is tilted such that, when the convex portion 4610 is inserted into the through-hole 4000, a pressing force of the tilted portion 4611*b* on the lower edge portion of the through-hole 4000 increases by the elasticity of the wedge member 4611. The upper end portion of the second plate portion 4610*b* of the convex portion 4610 comes into contact with the upper edge portion of the through-hole 4000 by a reactive force that the tilted portion 4611***b* receives from the lower edge portion of the through-hole 4000.

By the pressing force of the tilted portion 4611*b* acting on the lower edge portion of the through-hole 4000, the wedge member 4611 latches the convex portion 4610 to the edge portions of the through-hole 4000 in the support frame 400.

Specifically, as shown in FIG. 8, the convex portion 4610 of the retention sheet metal 461 is inserted into the through-hole 4000 of the support frame 400 with the tip end portion 4610*c* at the forefront.

When the tip end portion 4610*c* of the convex portion 4610 is inserted into the through-hole 4000, the wedge member 4611 of the retention sheet metal 461 is not yet in contact with the lower edge portion of the through-hole 4000 of the support frame 400 (see FIG. 8).

As shown in FIG. 9, the convex portion 4610 of the retention sheet metal 461 is further inserted into the through-hole 4000 of the support frame 400. Thus, the tilted portion 4611*b* of the wedge member 4611 comes into contact with the lower edge portion of the through-hole 4000 in the support frame 400.

The wedge member 4611 of the retention sheet metal 461 has elasticity. Therefore, when the convex portion 4610 of the retention sheet metal 461 is further inserted into the through-hole 4000 of the support frame 400, the tilted portion 4611*b* comes into contact with the lower edge portion of the through-hole 4000, and thus the tilted portion 4611*b* is bent so as to approach the root portion 4610*d* of the convex portion 4610. Thus, a pressing force that presses the edge portions of the through-hole 4000 in the support frame 400 is generated in the wedge member 4611 and at the upper end portion of the second plate portion 4610*b* of the convex portion 4610. By this pressing force, the convex portion 4610 is latched to the support frame 400, and the retention sheet metal 461 is retained by the support frame 400.

According to the present embodiment, the tilted portion 4611*b* of the wedge member 4611 latches the convex portion 4610 to the edge portions of the through-hole 4000. Thus, a situation where a gap is formed between the support frame 400 of the housing frame 40 and the retention sheet metal 461 that retains the waste toner bottle 460 can be suppressed. Consequently, vibrations and noises that are due to transmission of vibrations of the waste toner unit 46 to the housing frame 40 can be suppressed.

Next, with reference to FIG. 1, FIG. 2, FIG. 4 to FIG. 9, and mainly FIG. 3, a relationship among the drive mechanism 462 of the waste toner unit 46, the retention sheet metal 461, and the support frame 400 of the housing frame 40 will be described.

As shown in FIG. 3, the drive mechanism 462 includes a motor 4620, a transmission shaft 4621, and the transmission gear 4622. An input gear 4623 is provided at a first end of the transmission shaft 4621, and the input gear 4623 intermeshes with a relay gear 4624.

The relay gear 4624 includes a first gear 4624*a* that intermeshes with the input gear 4623, and a second gear 4624*b* that intermeshes with a drive gear 4620*a*. The drive gear 4620*a* is provided at a rotation shaft of the motor 4620.

The drive gear 4620*a* is a worm gear, and the second gear 4624*b* is a worm wheel. The transmission gear 4622 is provided at a second end of the transmission shaft 4621.

The drive mechanism 462 causes the waste toner bottle 460 to rotate. In other words, the motor 4620 rotates by being energized. A drive gear 4625 is provided in the motor 4620. The rotation of the motor 4620 is transmitted to the transmission gear 4622 via the relay gear 4624 and the transmission shaft 4621.

As described above, the transmission gear 4622 intermeshes with the bottle gear 4602 of the waste toner bottle 460. Therefore, the rotation of the transmission gear 4622 is transmitted to the bottle gear 4602 to thus cause the waste toner bottle 460 to rotate. By the rotation of the waste toner bottle 460, waste toner stored in the waste toner bottle 460 is stirred. The stirring of the waste toner prevents the waste toner from coagulating.

As described above, the waste toner bottle 460 is retained by the retention sheet metal 461. Further, the drive mechanism 462 is attached to the support frame 400. The drive mechanism 462 is supported by the support frame 400 near the through-hole 4000. Therefore, vibrations caused by the motor 4620 of the drive mechanism 462 propagate to the support frame 400 and also propagate to the retention sheet metal 461 from the waste toner bottle 460.

The vibrations that propagate from the motor 4620 to the support frame 400 and the vibrations that propagate to the retention sheet metal 461 via the waste toner bottle 460 may become a cause of abnormal noises at the connection portion between the support frame 400 and the retention sheet metal 461. The wedge member 4611 latches the convex portion 4610 to the edge portions of the through-hole 4000 to thus suppress the generation of abnormal noises.

In other words, details are as follows. As shown in FIG. 3, the vibrations of the motor 4620 of the drive mechanism 462 as a vibration source and the vibrations caused by the intermeshing of the drive gear 4620*a*, the relay gear 4624, and the input gear 4623 are transmitted to the support frame 400 via a support member (not shown).

Moreover, the vibrations transmitted from the transmission gear 4622 to the bottle gear 4602 are transmitted to the waste toner bottle 460, and the vibrations transmitted to the waste toner bottle 460 are transmitted to the retention sheet metal 461 that retains the waste toner bottle 460.

The retention sheet metal 461 is connected to the support frame 400. In other words, by the insertion of the convex portion 4610 of the retention sheet metal 461 into the through-hole 4000 of the support frame 400, the retention sheet metal 461 is connected to the support frame 400.

Therefore, the vibrations transmitted to the retention sheet metal 461 and the vibrations transmitted to the support frame 400 cause abnormal noises at the connection portion between the retention sheet metal 461 and the support frame 400.

However, by the wedge member 4611 of the retention sheet metal 461 latching the convex portion 4610 to the edge portions of the through-hole 4000 in the support frame 400, the retention sheet metal 461 is latched to the support frame 400.

According to the present embodiment, by the retention sheet metal 461 of the waste toner bottle 460 connected to the drive mechanism 462 being latched to the support frame 400 of the housing frame 40, generation of vibrations and noises at the connection portion between the retention sheet metal 461 and the support frame 400 can be suppressed.

Heretofore, the embodiment of the present disclosure has been described with reference to the drawings. It is noted that the present disclosure is not limited to the embodiment described above and can be variously modified without departing from the gist of the present disclosure. The drawings mainly show the respective constituent elements in a schematic form to help understand the present disclosure, and the numbers of respective constituent elements shown in the figures and the like are different from those of the actual configuration for the purpose of convenience in creating the drawings. Moreover, the respective constituent elements described in the embodiment above are mere examples which are not limited in particular, and can be variously modified substantially without departing from the effect of the present disclosure.

The present disclosure is applicable to the fields of image forming apparatuses.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a housing frame; and a waste toner unit, wherein the housing frame includes a support frame which supports the waste toner unit, the waste toner unit includes a waste toner bottle, and a retention sheet metal which retains the waste toner bottle, the support frame includes a through-hole, and the retention sheet metal includes a convex portion inserted into the through-hole, and a wedge member which protrudes from the convex portion and latches the convex portion to an edge portion of the through-hole in the support frame.

2. The image forming apparatus according to claim 1, wherein the wedge member includes a coupling portion connected to the convex portion, and a plate-like tilted portion which is formed to extend from the coupling portion toward a side of a root portion of the convex portion, is tilted from the coupling portion toward the root portion of the convex portion in a direction in which the tilted portion is set apart from the convex portion, and comes into contact with the edge portion of the through-hole.

3. The image forming apparatus according to claim 2, wherein the wedge member has elasticity, and the tilted portion is tilted such that, when the convex portion is inserted into the through-hole, a pressing force of the tilted portion on the edge portion of the through-hole increases by the elasticity of the wedge member.

4. The image forming apparatus according to claim 3, wherein the waste toner unit includes a drive mechanism which causes the waste toner bottle to rotate, and the drive mechanism is supported by the support frame.

* * * * *